US009544045B2

(12) United States Patent
Hoymann et al.

(10) Patent No.: US 9,544,045 B2
(45) Date of Patent: Jan. 10, 2017

(54) RELAYING UNICAST AND MULTICAST DATA IN A WIRELESS NETWORK

(75) Inventors: Christian Hoymann, Aachen (DE); Jörg Huschke, Aachen (DE); Mai-Anh Phan, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 14/344,726

(22) PCT Filed: Sep. 20, 2011

(86) PCT No.: PCT/EP2011/066334
§ 371 (c)(1),
(2), (4) Date: Mar. 13, 2014

(87) PCT Pub. No.: WO2013/041127
PCT Pub. Date: Mar. 28, 2013

(65) Prior Publication Data
US 2014/0348055 A1     Nov. 27, 2014

(51) Int. Cl.
*H04B 7/14* (2006.01)
*H04J 1/10* (2006.01)
*H04J 3/08* (2006.01)
*H04B 7/155* (2006.01)

(52) U.S. Cl.
CPC ................. *H04B 7/15557* (2013.01)

(58) Field of Classification Search
CPC ................................................. H04B 7/15557
See application file for complete search history.

(56) References Cited

U.S. PATENT DOCUMENTS

2012/0020273 A1*   1/2012   Mori .................. H04B 7/15557
370/312

FOREIGN PATENT DOCUMENTS

WO    WO 2010/134195 A1    11/2010
WO    WO 2011/052135 A1    5/2011

OTHER PUBLICATIONS

LG Electronics (R1-090663, Hybrid of AF and DF in layer-2 or -3 Relay, 3GPP TSG RAN WG1 Meeting #56, Feb. 9-13, 2009).*
International Search Report, International Application No. PCT/EP2011/066334, Apr. 5, 2012.

(Continued)

*Primary Examiner* — Maharishi Khirodhar
(74) *Attorney, Agent, or Firm* — Myers Bigel, P.A.

(57) ABSTRACT

A relay node for a wireless network is configured for transmissions on the basis of a radio frame with a plurality of subframes. The relay node includes a first relay path and a second relay path. The first relay path is configured to receive, in a first subframe of the subframes, first unicast transmission signals, to decode the first unicast transmission signals to obtain unicast data, and to forward the decoded unicast data by sending second unicast transmission signals in a second subframe of the subframes. The second relay path is configured to receive, in a third subframe of the subframes, multicast transmission signals, to amplify the received multicast transmission signals, and to send the amplified multicast transmission signals in the third subframe. The relay node may switch between the first relay path and the second relay path in order to implement a hybrid Decode-and-Forward and Amplify-and-Forward relaying operation.

19 Claims, 9 Drawing Sheets

(56) References Cited

OTHER PUBLICATIONS

Written Opinion of the International Searching Authority, International Application No. PCT/EP2011/066334, Apr. 5, 2012.
Written Opinion of the International Preliminary Examining Authority, International Application No. PCT/EP2011/066334, Sep. 9, 2013.
International Preliminary Report on Patentability, International Application No. PCT/EP2011/066334, Feb. 3, 2014.
LG Electronics, "Hybrid of AF and DF in Layer-2 or -3 Relay", 3GPP TSG RAN WG1 Meeting #56, R1-090663, Athens, Greece, Feb. 9-13, 2009, 4 pages.
ETSI, Technical Specification, "Universal Mobile Telecommunications System (UMTS); LTE; Evolved Universal Terrestrial Radio Access (E-UTRA); Physical layer for relaying operation (3GPP TS 36.216 version 10.1.0 Release 10)", ETSI TS 136 216 V10.1.0 (Jan. 2011), 16 pages.
3GPP, Technical Report, "3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814, V9.0.0 (Mar. 2010), 104 pages.
3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.1.0 (Sep. 2010), 192 pages.

\* cited by examiner

RELAYING UNICAST AND MULTICAST DATA IN A WIRELESS NETWORK

CROSS REFERENCE TO RELATED APPLICATION

This application is a 35 U.S.C. §371 national stage application of PCT International Application No. PCT/EP2011/066334, filed on 20 Sep. 2011, the disclosure and content of which is incorporated by reference herein in its entirety. The above-referenced PCT International Application was published in the English language as International Publication No. WO 2013/041127 A1 on 28 Mar. 2013.

TECHNICAL FIELD

The present invention relates to methods of relaying unicast and multicast data in a wireless network and to corresponding devices.

BACKGROUND

In mobile networks, e.g., according to the 3GPP (3rd Generation Partnership Project), it is known to use relaying for improving capacity and/or coverage of the network. For example, in 3GPP LTE (Long Term Evolution) relaying was introduced in the Release 10 Technical Specifications (TSs). The general idea of relaying is that a relay node (RN) receives a transmission from a sender and forwards this transmission to a recipient. For example, a transmission can be received from a base station, in 3GPP LTE referred to as "evolved NodeB" (eNB), and be forwarded to a mobile terminal or other type of user equipment (UE), or vice versa. In 3GPP LTE, a RN communicates with its serving eNB, also referred to as donor eNB, via a backhaul link, and provides access to the UEs attached to a relay cell of the RN via an access link. Both the backhaul link and the access link are implemented using the LTE radio interface.

According to the 3GPP TSs, a Decode and Forward (DF) type relaying operation is used to relay unicast transmissions. In this type of relaying operation, the useful signal of the sender is decoded by the RN before being forwarded to the receiver. There are basically two different realizations of RNs. There are RNs, which can separate access and backhaul links sufficiently well, e.g., by means of separated antennas, also known as Type 1b RNs, or by means of separated frequency bands, also known as Type 1a RNs. Further, there are RNs, whose access and backhaul links could interfere with each other severely such that configuration of separate access and backhaul subframes is used, also known as Type 1 RNs. In backhaul subframes, the RN can communicate with the donor eNB and in access subframes it can communicate with UEs attached to the relay cell. As defined in 3GPP TS 36.216, the RN declares downlink (DL) backhaul subframes as MBSFN (Multimedia Broadcast/Multicast Services over Single Frequency Network) subframes towards the connected UEs in order not to confuse the connected UEs during backhaul subframes.

In 3GPP LTE, Multimedia Broadcast/Multicast Services (MBMS) are provided for efficient delivery of multicast data or broadcast data. Multicast data are data intended for reception by multiple UEs, and broadcast data can be considered as a specific case of multicast data which are intended for all UEs capable of receiving the multicast data. In the context of MBMS, broadcast data may be received by all connected UEs supporting MBMS, whereas reception of multicast data may be limited to a subgroup of the connected UEs by authentication.

A MBSFN coordinates the transmission of MBMS data, i.e., broadcast data or multicast data, among a group of eNBs such that all involved eNBs jointly transmit the data, i.e., transmit the same data in a synchronized manner using the same time and frequency resources. From a UE perspective all signals combine over the air resulting in an improved signal to interference and noise ratio (SINR). MBSFN transmissions of MBMS data are carried on the Physical Multicast Channel (PMCH) and performed in the MBSFN region of the MBSFN subframe. In LTE Releases 9 and 10, the non-MBSFN region, also referred to as the control region, which consists of the first or first and second OFDM symbols, is used by the eNB to provide cell-specific control information. The size of the control region is semi-statically configured by the Multi-cell/Multicast Coordination Entity (MCE) for all cells participating in an MBSFN area and signaled via PCFICH. However, according to 3GPP TS 36.300, Section 15.1, RNs do not support MBMS.

Accordingly, there is a need for techniques which allow for efficient relaying of both unicast data and multicast data or broadcast data.

SUMMARY

According to an embodiment of the invention, a method of relaying unicast and multicast data in a wireless network is provided. The wireless network comprises a RN which is configured for transmissions on the basis of a radio frame with a plurality of subframes. According to the method, the RN receives, in a first subframe of the subframes, first unicast transmission signals. The RN decodes the first unicast transmission signals to obtain unicast data and forwards the decoded unicast data by sending second unicast transmission signals in a second subframe of the subframes. Further, the RN receives, in a third subframe of the subframes, multicast transmission signals. The RN amplifies the received multicast transmission signals and sends the amplified multicast transmission signals in the third subframe.

According to a further embodiment of the invention, a RN for a wireless network is provided. The RN is configured for transmissions on the basis of a radio frame with a plurality of subframes. The RN comprises a first relay path and a second relay path. The first relay path is configured to receive, in a first subframe of the subframes, first unicast transmission signals, to decode the first unicast transmission signals to obtain unicast data, and to forward the decoded unicast data by sending second unicast transmission signals in a second subframe of the subframes. The second relay path is configured to receive, in a third subframe of the subframes, multicast transmission signals, to amplify the received multicast transmission signals, and to send the amplified multicast transmission signals in the third subframe.

According to further embodiments, other methods, devices, or computer program products for implementing the methods may be provided.

DETAILED DESCRIPTION OF EMBODIMENTS

In the following, the invention will be explained in more detail by referring to exemplary embodiments and to the accompanying drawings. The illustrated embodiments relate to concepts of relaying both unicast data and multicast data, which may be accomplished by using a hybrid relaying operation which applies DF type relaying operation to unicast transmissions and Amplify-and-Forward (AF) type relaying operation to multicast data. The concepts may be applied in a wireless network according to 3GPP LTE. However, it is to be understood that the illustrated concepts may be applied in other types of wireless networks as well.

Figure 1:
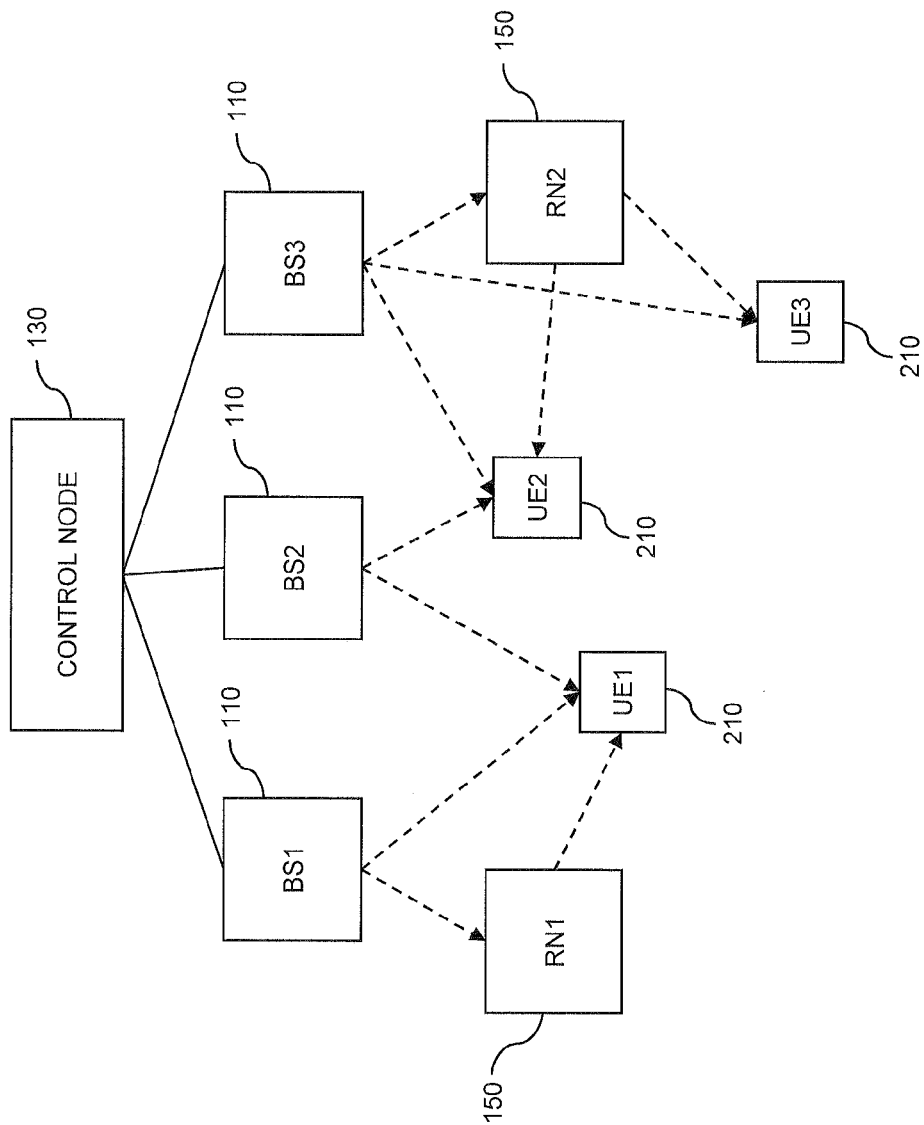
FIG. 1 schematically illustrates a wireless network in which concepts according to embodiments of the invention may be implemented.

FIG. 1 schematically illustrates an exemplary wireless network in which concepts according to embodiments of the invention can be applied.

As illustrated, the wireless network includes a number of base stations 110, in particular a first base station (BS1), a second base station (BS2), and a third base station (BS3). Further, the wireless network includes a number of RNs 150, in particular a first RN (RN1), and a second relay node (RN2). In addition, the wireless network includes a control node 130, which has the purpose of coordinating multicast transmissions in the wireless network, which may also include supplying multicast data to the base stations 110. This may be accomplished using wire-based links, illustrated by solid lines. The base stations 110 send the multicast data in multicast transmissions, which is accomplished using radio links, illustrated by dashed arrows. The multicast transmissions may be relayed by the RNs 150. In the illustrated example, RN1 relays multicast transmissions of BS1 and RN2 relays multicast transmissions of BS3. In addition, the BSs 110 may also send unicast transmissions with unicast data to their subordinate RNs 150. The unicast data may be relayed by the RNs 150 or may be used in the RNs 150 for control purposes. For example, RN1 may relay unicast data provided by BS1, i.e., BS1 may be regarded as a donor base station of RN1. Similarly, RN2 may relay unicast data provided by BS3, i.e., BS3 may be regarded as a donor base station of RN2.

A number of mobile terminals or other types of UEs 210, in particular a first UE (UE1), a second UE (UE2), and a third UE (UE3), are located in a coverage area of the wireless network which allows for receiving the multicast data. In the illustrated example, UE1 receives the multicast data in a joint transmission from RN1, BS1 and BS2, UE2 receives the multicast data in a joint transmission from BS2, BS3 and RN2, and UE3 receives the multicast data in a joint transmission from BS3 and RN2. Here, the term "joint transmission" means that the multicast data are transmitted in a synchronized manner using the same time and frequency resources such that the transmitted signals constructively combine over the air. The term "multicast data" means data intended for reception by multiple UEs and also includes broadcast data. The term "broadcast data" means a specific case of multicast data which are intended for all UEs capable of receiving the multicast data.

The wireless network of FIG. 1 may be implemented according to 3GPP LTE. In this case, the multicast transmissions may correspond to MBSFN transmissions of MBMS data. Broadcast data may then be received by all UEs supporting MBMS, whereas reception of multicast data may be limited to a subgroup of the UEs, e.g., by authentication.

Figure 2:
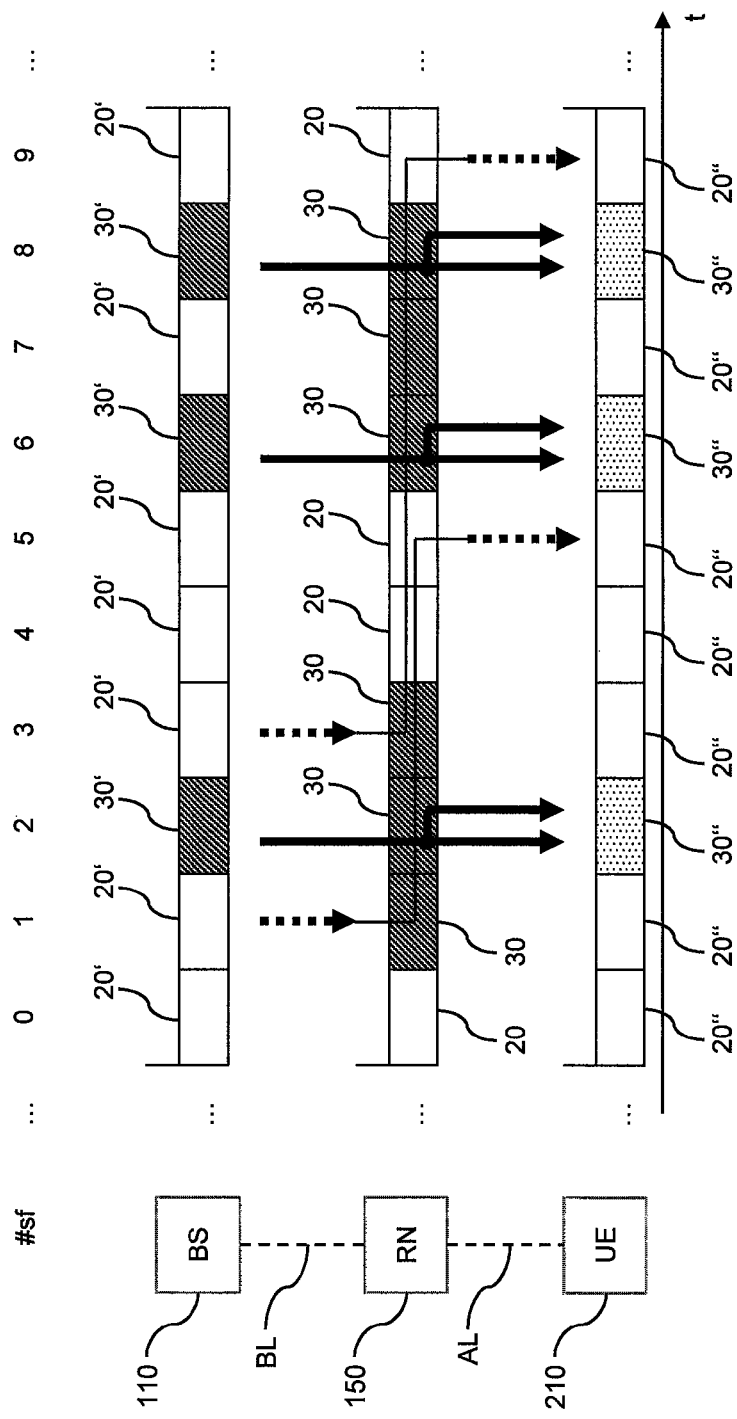
FIG. 2 schematically illustrates an example of transmissions in a wireless network comprising a RN according to an embodiment of the invention.

FIG. 2 schematically illustrates an example of downlink (DL) transmissions in a wireless network when operating a RN according to an embodiment of the invention, e.g., a RN as illustrated in FIGS. 1 and 2. FIG. 2 also depicts the RN 150, the donor base station (BS) 110 of the RN 150, and a UE 210. Further, a backhaul link (BL) between the donor base station 110 and the RN 150 as well as an access link (AL) between the RN 150 and the UE 210 are depicted. The access link is used for multicast transmissions to the UE 210 and other UEs. In addition, the access link is used for DL unicast transmissions from the RN 150 to the UE 210 or for uplink (UL) unicast transmissions from the UE 210 to the RN 150. Next to the RN 150 a radio frame configuration for transmissions by the RN is illustrated. Next to the donor base station 110 a radio frame configuration for transmissions by the donor base station 110 is illustrated. Next to the UE 210, a radio frame configuration used for reception by the UE 210 is illustrated. As shown, the radio frame configurations each comprise a plurality of subframes 20, 30, 20', 30', 20", 30". The row denoted by #sf indicates an index of the subframes.

In the radio frame configuration of the base station and in the radio frame configuration of the RN, shading indicates subframes 30, 30' for multicast transmission. In the above-mentioned 3GPP LTE scenario, these subframes may be MBSFN subframes. Absence of shading indicates regular subframes, i.e., subframes for unicast transmission. In the above-mentioned 3GPP LTE scenario, these subframes may be non-MBSFN subframes. In the radio frame configuration of the UE, shading indicates subframes 30" in which the UE is configured for reception of multicast transmissions, e.g., MBSFN transmissions of MBMS data.

In FIG. 2, transmissions are illustrated by vertical arrows. Solid arrows illustrate multicast transmissions, i.e., transmissions to a plurality of recipients. The multicast transmissions are accomplished jointly from the base station 110 to the UE 210 and from the RN 150 to the UE 210. More specifically, the RN 150 receives signals of a multicast transmission, in the following referred to as multicast transmission signals, in one of the subframes for multicast transmission 30, amplifies the multicast transmission signals, and sends the amplified multicast transmission signals in the same subframe for multicast transmission 30. In the example of FIG. 2, this type of relaying operation is applied in the subframes with index 2, 6 and 8.

At the UE 210, the multicast transmission signals from the base station 110 and from the RN 150 combine over the air and appear as a single signal. Accordingly, the relaying operation with respect to the multicast transmission is transparent to the UEs. Further, also the base station 110 does not need to be aware of the relaying operation of the RN 150 with respect to the multicast transmissions.

Dotted arrows in FIG. 2 illustrate unicast transmissions, i.e., transmissions to a single recipient. As illustrated in FIG. 2, the RN 150 also relays unicast transmissions. For this purpose, the RN 150 receives signals of a unicast transmission, in the following referred to as unicast transmission signals, from the base station 110. This is accomplished in one of the subframes for multicast transmission 30. The RN 150 then decodes the unicast transmission signals to obtain unicast data, and forwards the decoded unicast data by sending further unicast transmission signals in another one of the subframes 20, 30. In the example of FIG. 2, this type of relaying operation is applied in the subframes with index 1 and 5, and in the subframes with index 3 an 9.

As can be seen, the donor base station 110 and the RN 150 jointly transmit the multicast transmissions to the UE 210 and the relaying operation applied by the RN 150 to the multicast transmissions corresponds to an AF type relaying operation. That is to say, the multicast transmissions are not decoded before being forwarded. The relaying operation applied to the unicast transmissions in turn corresponds to a DF type relaying operation, i.e., the unicast transmissions are decoded before being forwarded. In the example of FIG. 2, the subframes in the radio frame configuration of the RN 150, which are used by the RN 150 to receive the unicast transmissions from the donor base station 110, i.e., the backhaul subframes, correspond to subframes for multicast transmission 30. This is in conformity with 3GPP TS 36.216 and avoids confusion of the UE 210 because in the subframes for multicast transmission the UE 210 does not expect any transmission, e.g., of reference signals, from the RN 150 to the UE 210.

Accordingly, the RN 150 uses the DF type relaying operation for the unicast transmissions whereas it uses the AF type relaying operation for the multicast transmissions. This has the advantage that no separate transmission of backhaul data is needed for the multicast transmissions. In this way, an increased number of subframes is available for relaying of unicast transmissions.

Figure 3:
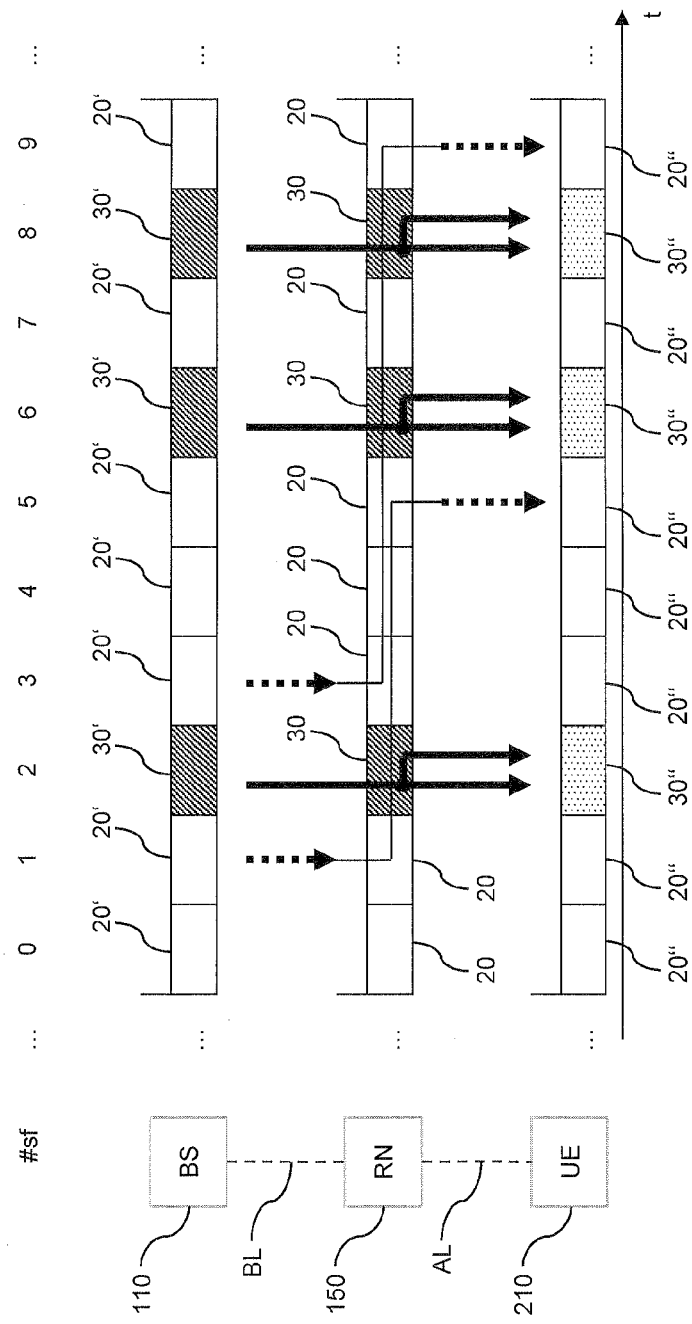
FIG. 3 schematically illustrates a further example of transmissions in a wireless network comprising a RN according to an embodiment of the invention.

FIG. 3 schematically illustrates a further example of transmissions in a wireless network when operating a RN according to an embodiment of the invention. The scenario of FIG. 3 is similar to that of FIG. 2, but further assumes that the access link and the backhaul link are isolated from each other during the unicast transmissions, e.g., as in Type 1a or 1b RNs. This isolation may be achieved by using spatially separated transmission channels, e.g., by using directional antennas, and/or by using different frequencies. It is to be understood that the joint multicast transmissions from the donor base station 110 and from the RN 150 will use the same frequencies.

As illustrated in FIG. 3, the isolation between backhaul link and access link allows for using subframes for unicast transmission 20, e.g., non-MBSFN subframes, as the backhaul subframes in which the RN 150 receives the unicast data from the donor base station 110. In the example of FIG. 3, the subframes with index 1 and 3, i.e., the backhaul subframes for relaying the unicast data, are subframes for unicast transmission 20.

Figure 4:
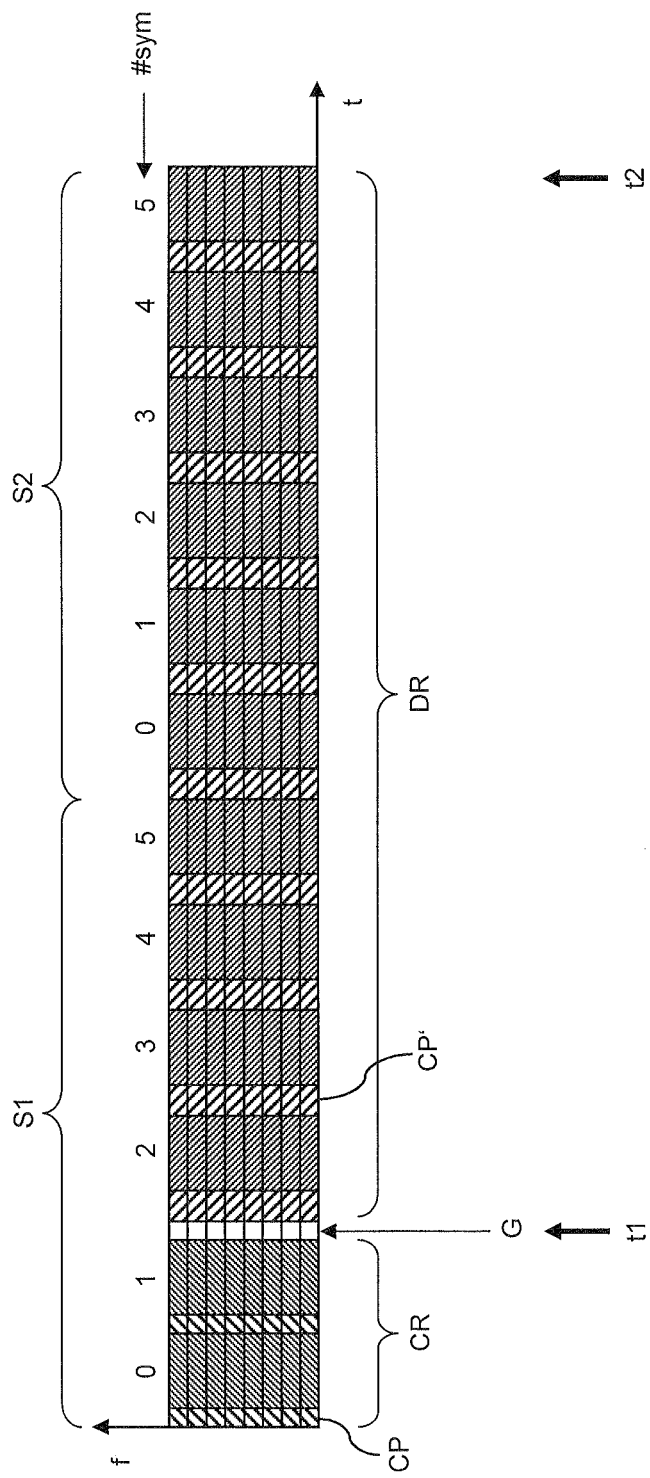
FIG. 4 schematically illustrates a subframe for multicast transmission as used in an embodiment of the invention.

FIG. 4 schematically illustrates a subframe for multicast transmission as used in an embodiment of the invention. In particular, the illustrated structure of the subframe corresponds to a MBSFN subframe as used in the above-mentioned 3GPP LTE scenario. The illustration shows the time and frequency resources of the subframe in form of blocks arranged along a time axis, denoted by t, and a frequency axis, denoted by f.

As illustrated, the subframe for multicast transmission includes a first slot S1 and a second slot S2, each consisting of six OFDM symbols. In FIG. 4, a symbol index is denoted by #sym. In the illustrated example, the first two OFDM symbols of the subframe, i.e., the OFDM symbols with index 0 and 1 in the first slot S1, form a control region CR of the subframe. The control region typically includes control data, such as L1/L2 (Layer 1/Layer 2) control data. The remaining OFDM symbols of the subframe, i.e., the OFDM symbols with index 2 to 5 in the first slot S1 and the OFDM symbols with index 0 to 5 in the second slot S2, form a data region DR of the subframe, in the illustrated example of an MBSFN subframe also referred to as MBSFN region.

Each OFDM symbol of the subframe includes a cyclic prefix CP, CP'. For the OFDM symbols of the data region DR, typically a length of the cyclic prefix CP' is used which is extended as compared to the length of the cyclic prefix for the OFDM symbols of the control region CR. With the extended cyclic prefix CP', it can be taken into account that the UE typically receives the joint MBSFN transmission in the multicast region from various sources, which may have different distances to the UE. According to 3GPP TS36.211 Table 6.12-1, the cyclic prefix CP of the first OFDM symbol of the control region CR, i.e., the OFDM symbol with index 0 in the first slot S1, has a length of about $T_{CP0}$=5.2 µs, the cyclic prefix CP of the second OFDM symbol of the control region CR, i.e., the OFDM symbol with index 1 in the first slot S1, has a length of about $T_{CP0}$=4.7 µs, and the cyclic prefixes CP' of the OFDM symbols in the multicast region MR each have an extended length of about $T_{CP-e}$=16.7 µs.

The OFDM symbols in the subframe are arranged according to a regular grid with a basic length of 1 s/12=(T+$T_{CP-e}$), where T denotes the length of an OFDM symbol and is about T=66.7 µs. All OFDM symbols within the MBSFN region are transmitted according to this grid, whereas the OFDM symbols within the control region CR use the shorter cyclic prefix CP and are thus shorter than two OFDM symbols using the extended cyclic prefix CP' of the multicast region. Thus, there is a gap G between the last OFDM symbol of the control region CR and the first OFDM symbol of the multicast region. The length of the gap G depends on whether one or two OFDM symbols are configured for the control region CR. In the example of FIG. 4, in which the control region of the subframe includes two OFDM symbols, the length of the gap G may be about 13.5 µs.

The control region CR may carry DL control signaling from the donor eNB, which can be received by the RN and also by UEs, whereas the data region DR may carry the actual MBSFN transmission by the RN and by the donor eNB.

The non-MBSFN subframes used as subframes for unicast transmission have a similar structure and include a control region and a data region as well. However, the normal shorter cyclic prefix CP is used both in the control region and in the data region of the non-MBSFN subframes.

DF to AF switching may occur between the control region CR of the MBSFN subframe and the data region DR of the MBSFN subframe, as illustrated by time t1 in FIG. 4, and AF to DF switching may occur at the end of the MBSFN subframe between the data region MR of the MBSFN subframe and a control region of the next subframe, as illustrated by time t2 in FIG. 4. In this way, it becomes possible to decode the control region CR of the MBSFN subframe in the RN and to use control data transmitted in the control region CR for controlling operation of the RN.

As illustrated in FIG. 4, when applying the extended cyclic prefix CP' to the data region DR of the MBSFN subframe and applying the normal cyclic prefix CP to the control region CR of the MBSFN subframe, there is a gap G between the last OFDM symbol of the control region CR and the first OFDM symbol of the data region DR. The length of the gap G depends on whether one or two OFDM symbols are configured for the control region CR. This relaxes the timing requirements on switching.

If the normal cyclic prefix CP or the extended cyclic prefix CP' in conjunction with the gap G is not enough, DF to AF switching time could be taken from the data region DR, from the control region CR or from both the data region DR and the control region CR. Similarly, AF to DF switching time could be taken from the data region DR, from the control region CR or from both the data region DR and the control region CR. In some scenarios, the control information may be considered to be more important so that it is preferred to take the switching time from the data region DR only. This may shorten the duration of the first and/or last multicast data symbol of the data region DR.

When relaying unicast data by the DF type relaying operation and relaying multicast data by the AF type relaying operation as explained above, the RN 150 may switch between these two types of relaying operation on the basis of information indicating which of the subframes correspond to the DF type relaying operation and which ones of the subframes correspond to the AF type relaying information. The RN 150 may obtain this information from control data received from the donor base station 110, e.g., from control data transmitted in a control region of the subframes, e.g., in the control region CR of a MBSFN subframe as illustrated in FIG. 4 or from the control region of a non-MBSFN subframe. The control data could also be obtained from a data region of the subframes, e.g., from the data region DR of the MBSFN subframe as illustrated in FIG. 4 or from the data region of a non-MBSFN subframe. For this purpose, also signals in the control region and/or data region of the subframes for multicast transmission used for relaying the multicast data may be decoded. However, since the AF type relaying operation is used for the multicast transmissions, this decoding does not need to be performed before forwarding the multicast transmissions, but may be accomplished later. The information may also be obtained from a message transmitted from the base station 110 to the RN, e.g., a message defined on a higher protocol layer and transmitted in one or more unicast transmissions from the base station 110 to the RN 150.

In the following, options of obtaining the information which ones of the subframes correspond to the DF type relaying operation and which ones of the subframes correspond to the AF type relaying information will be described in relation to the 3GPP LTE scenario in which the multicast transmissions correspond to MBSFN transmissions of MBMS data.

According to a first option, RN 150 uses the AF type relaying operation in all MBSFN subframes configured in the radio frame configuration of the base station 110. The RN 150 can obtain the information which ones of the subframes are configured as MBSFN subframes by reading a Multicast Control Channel (MCCH) transmitted by the base station 110. If the base station serves multiple MBSFN areas, one MCCH is provided per MBSFN area and the RN 150 can read each of these MCCHs. The MCCHs can be found by reading a System Information Block (SIB) transmitted by the base station 110, in particular a SIB referred to as SIB13. Alternatively, the base station 110 might use dedicated control signalling, e.g., a dedicated RRC message, to signal this information to the RN 150.

According to a second option, the RN 150 uses the AF type relaying operation only in the subframes for a subset of MBSFN areas. In this case, which ones of the MBSFN areas shall be relayed may be signalled to the RN 150 by the base station, e.g., by using dedicated control signaling. For example, the base station 110 can use a dedicated RRC message to signal this information to the RN 150. The RN 150 may obtain the information which ones of the subframes are used by the base station 110 for the selected subset of MBSFN areas by reading the corresponding MCCHs transmitted by the base station. The MCCHs can again be found by reading a SIB transmitted by the base station 110, in particular the SIB13. Alternatively, the base station 110 might use dedicated control signalling, e.g., a dedicated RRC message, to signal this information to the RN 150.

In the above options, it is also possible to use the AF type relaying operation only in those MBSFN subframes which are actually used by the base station 110 for MBMS transmissions. In this way, it may be taken into account that not all subframes configured as MBSFN subframes and allocated to multicast channels as defined by the MCCH are actually used for MBSFN transmissions. For example, the base station 110 could use subframes configured as MBSFN subframes for unicast transmissions, e.g., if there is less MBMS data to be transmitted than what fits into a Multicast Channel scheduling period (MSP), which means that the MBSFN subframes towards the end of the MSP can be used for unicast transmissions by the base station 110. The RN 150 can determine which subframes are actually used for MBMS transmissions by reading the Multicast Channel scheduling information (MSI) transmitted by the base station 110. Alternatively, the base station 110 might use dedicated control signaling, e.g., a dedicated RRC message, to signal this information to the RN 150. By performing the AF type relaying operation only in the subframes actually used by the base station 110 for MBMS transmissions, it can be avoided that the AF type relaying operation is applied to subframes configured as MBSFN subframes but used for unicast transmissions, which could in turn cause undesired interference with the unicast transmission from the base station 110.

Figure 5:
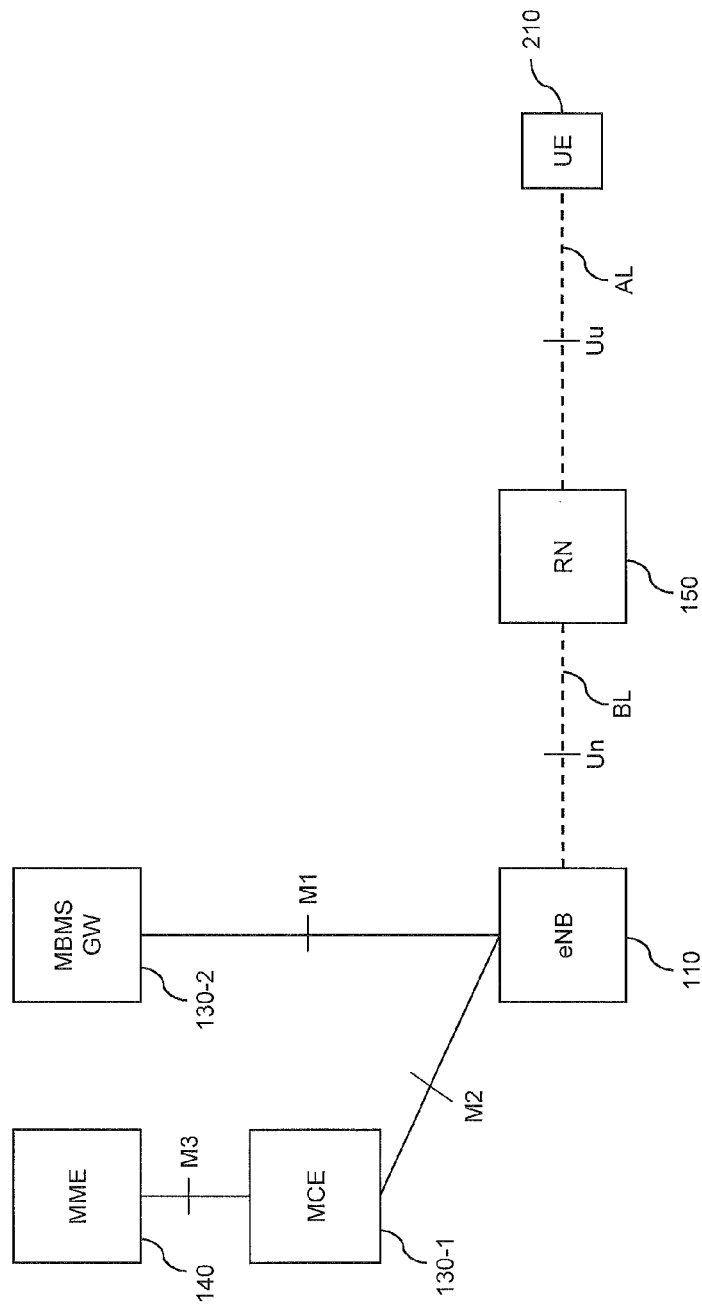
FIG. 5 further illustrates structures in a wireless network according to an embodiment of the invention.

Structures of the wireless network in an implementation according to 3GPP LTE are further illustrated in FIG. 5. For the sake of clarity, FIG. 5 illustrates only a single base station 110, termed as eNB in accordance with the 3GPP LTE terminology, a single RN 150, and a single UE 210. However, it is to be understood that multiple base stations, multiple RNs, and/or multiple UEs may be present.

As illustrated in FIG. 5, the control node 130 of FIG. 1 may be implemented by multiple entities, namely an MCE 130-1, and an MBMS gateway (MBMS GW) 130-2. In addition, FIG. 5 also illustrates a Mobility Management Entity (MME) 140.

Functionalities of the MCE 130-1 include admission control and allocation of radio resources to be used by eNBs and RNs, e.g., the eNB 110 and the RN 150, in an MBSFN area for joint transmission of MBMS signals in MBSFN transmission mode. The MCE 130-1 may also decide on a MCS to be used for the joint transmission. Functionalities of the MBMS GW 130-2 include providing the multicast data to eNBs, e.g., to the eNB 110. As illustrated, the MCE 130-1 may be coupled to the MME 140 via an interface termed as "M3", the MCE 130-1 may be coupled to the eNB 110 via an interface termed as "M2", and the MBMS GW 130-2 may be coupled to the eNB 110 via an interface termed as "M1". Additional functionalities of the MCE 130-1 and the MBMS GW 130-2 and properties of the interfaces M1, M2, and M3 may be as defined in 3GPP TS 36.300. As further illustrated, the eNB 110 is coupled to the RN 150 via a backhaul link BL which may be established via an LTE radio interface termed as "Un", and the RN 150 is coupled to the UE 210 via an access link which may be established via an LTE radio interface termed as "Uu". Further details concerning the Un interface and the Uu interface can be found in the 3GPP TSs.

The eNB 110 receives control plane information from the MCE via the M2 interface. MBMS data, also referred to as user plane data, are transmitted from the MBMS GW 130-2 via the M1 interface. As illustrated, both the M1 and the M2 interfaces may be terminated in the eNB 110. Nonetheless, since the AF type relaying operation as explained above does not require such interfaces, it becomes possible for the RN 150 to join MBSFN transmissions. Alternatively, it would also be possible to terminate at least one of the M1 and M2 interfaces in the RN 150. This could be implemented in a similar manner as for the existing S1 and X2 interfaces used for unicast transmissions. In such a case, the eNB 110 might serve as a proxy for the M1 and/or the M2 interface. With such an architecture control plane and user plane data could be transmitted all the way to the RN 150.

However, when using the AF type relaying operation as explained above, user plane data does not need to be transmitted to the RN 150. So at least the M1 interface is not required to terminate in the RN 150, and the user plane data does not need to be forwarded by the eNB 110. Further, as explained above, the RN 150 may obtain control data to be used for implementing the AF type relaying operation by monitoring transmissions by the eNB 110, e.g., by reading the MCCH and/or MSI. Accordingly, also the M2 interface is not required in the RN 150 for implementing the AF type relaying operation. In some embodiments, the eNB 110 may be provided with information on whether the RN 150 supports the AF type relaying operation for MBSFN transmissions or if the RN 150 supports a DF type relaying operation not only for unicast transmissions, but also for the MBSFN transmissions. For example, such information could be provided to the eNB as part of RN capability information. The RN capability information could signaled to the eNB 110 by Operations Support Systems (OSS) or directly by the RN 150 via a RRC message. Depending on the RN capability information, the eNB 110 may act as a proxy for the M1 and/or M2 interfaces or not.

As mentioned above, in some cases the AF type relaying operation as explained above may involve reading the MCCH, the MSI and/or control signaling to indicate MBSFN areas. In some embodiments, if the M2 interface terminates in the RN 150 and the eNB 110 acts as a proxy with respect to the control plane data transmitted via the M2 interface, information contained in the MCCH, the MSI and/or information on subsets of MBSFN areas could be made available to the RN 150 via the M2 interface.

Figure 6:
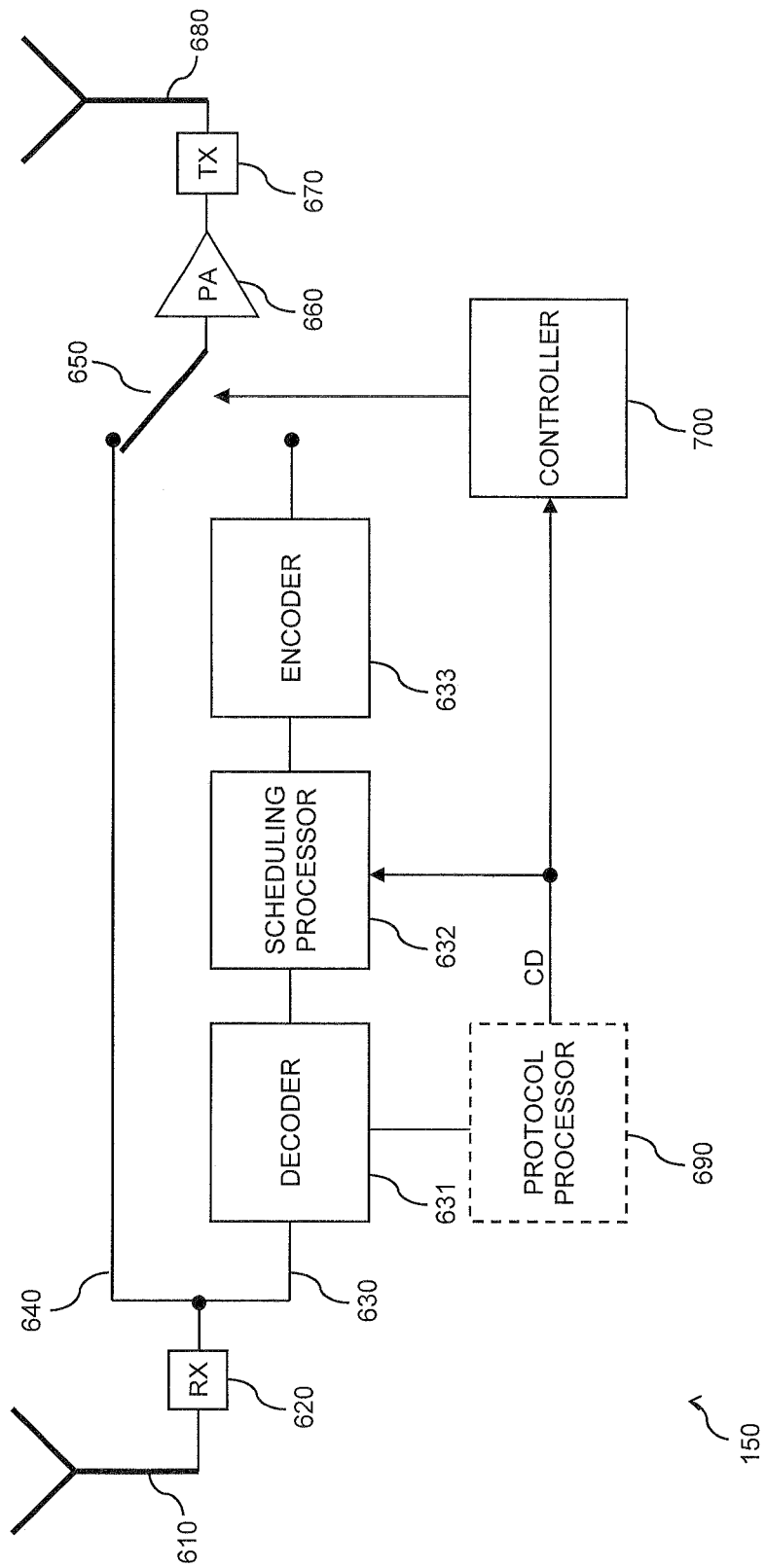
FIG. 6 schematically illustrates a RN according to an embodiment of the invention.

FIG. 6 illustrates structures of a RN 150 according to an embodiment of the invention, which is configured to operate as explained above by using the DF type relaying operation for relaying unicast transmissions and the AF type relaying operation for relaying multicast transmissions. As illustrated, the RN 150 is provided with two branches, namely a first relay path 630 and a second relay path 640. The first relay path 630 corresponds to the DF type relaying operation, and the second relay path 640 corresponds to the AF type relaying operation. As further illustrated, the RN 150 is provided with a receive antenna 610, a receiver (RX) 620, a power amplifier (PA) 660, a transmitter (TX) 670, and a transmit antenna 690 shared by the first relay path 630 and the second relay path 640. The RN 150 is also provided with a switch 650 for selecting whether the first relay path 630 or the second relay path 640 is used for forwarding transmissions. For this purpose, the switch 650 is configured to selectively couple either the first relay path 630 or the second relay path 640 to the transmitter 670. The receiver 620 may include, e.g., an input filter, an input amplifier, a demodulator, and/or other receive components. The transmitter 670 may include an output filter, an output amplifier, a modulator and/or other transmit components. The RN is also provided with a controller 700 for controlling operations of the switch 650. The RN 150 may also include a protocol processor 690 coupled to the first relay path 630.

As illustrated, the first relay path 630 includes a decoder 631, a scheduling processor 632, and an encoder 633. The decoder 631 has the purpose of decoding received signals to obtain data therefrom. In particular, the decoder 631 may be used in the above-mentioned DF type relaying operation to decode the unicast transmission signals and thereby obtain the unicast data to be forwarded. The scheduling processor 632 has the purpose of scheduling the unicast transmission for forwarding the unicast data, e.g., by selecting a suitable later subframe for this unicast transmission. The encoder 633 has the purpose of encoding the unicast data to be forwarded into this unicast transmission.

During the DF type relaying operation, the switch 650 couples the first relay path 630 to the power amplifier 660, the transmitter 670 and the transmit antenna 680. Accordingly, the signals as received by the antenna 610, and the receiver 620, i.e., the unicast transmission signals, are supplied via the first receive path 630 to the power amplifier 660, the transmitter 670 and the transmit antenna 680. Accordingly, the unicast transmission signals are decoded by the decoder 631 to obtain the unicast data to be forwarded, the unicast transmission for forwarding the unicast data is scheduled, and the unicast data are encoded into the unicast transmission before the unicast transmission signals of this transmission are amplified by the power amplifier 660 and sent by the transmitter 670 and the transmit antenna 680.

As compared to that, during the AF type relaying operation, the switch 650 couples the second relay path 640 to the power amplifier 660, the transmitter 670 and the transmit antenna 680. Accordingly, the signals as received by the antenna 610, and the receiver 620, i.e., the multicast transmission signals, are supplied via the second receive path 640 to the power amplifier 660, the transmitter 670 and the transmit antenna 680. In this way, the multicast transmission signals are not decoded before being forwarded by the RN 150. Due to the arrangement of the switch 650 downstream of the decoder 631, the decoder 631 can be supplied with the received signals also during the AF type relaying operation and the signals of the multicast transmissions can be decoded as well, e.g., in order to obtain control data therefrom.

The protocol processor 690 may be used to obtain control data CD from the signals as decoded by the decoder 631. The control data CD may be supplied to the controller 700 and be used for controlling operation of the switch 650. Further, the control data may also be supplied to the scheduling processor 632 and be used for scheduling unicast transmissions by the RN.

During the AF type relaying operation, it is desirable to avoid interference between the receive signal at the receive antenna 610 and the transmit signal from the transmit antenna 680. This can be achieved by providing the receive antenna 610 and the transmit antenna 680 sufficiently isolated or separated. Alternatively or in addition, self-interference cancellation can be done by sophisticated baseband processing, e.g., in the transmitter 670.

Switching between the DF type relaying operation and the AF type relaying operation by the switch 650 may be accomplished on a short timescale, e.g., with switching times which are shorter than the cyclic prefix CP, CP' as explained in connection with FIG. 4. If the switching times are longer, "gaps" in the relaying operation may be considered.

Figure 7:
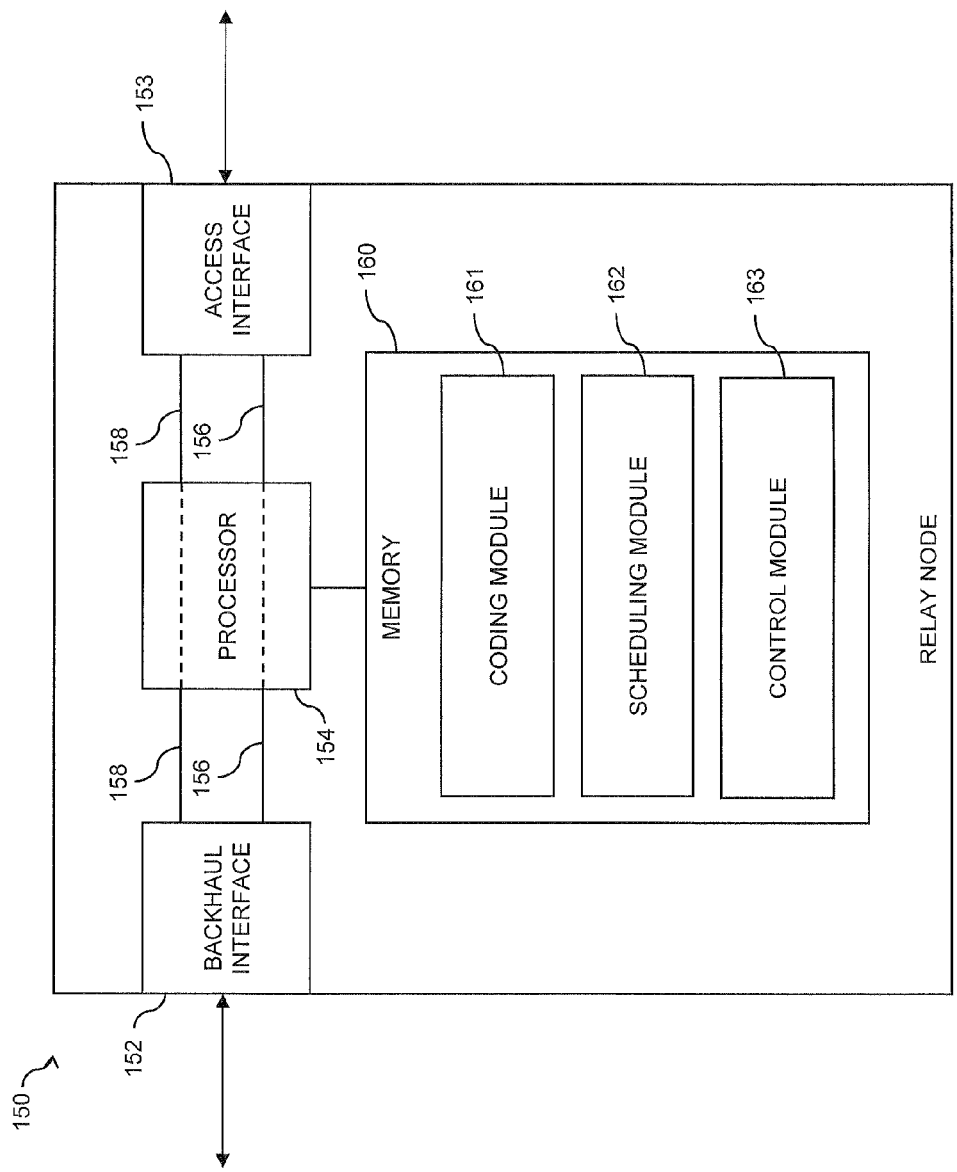
FIG. 7 schematically a processor-based implementation of the RN.

FIG. 7 illustrates a processor-based implementation of the RN 150 according to an embodiment of the invention. The RN 150 may implement the above-described functionalities of relaying unicast data and multicast data.

In the illustrated example, the RN 150 includes a backhaul interface 152 for communication with the donor base station and an access interface 153 for communication with UEs. The backhaul interface 152 and the access interface 153 may be implemented by a single physical radio interface, e.g., including corresponding shared antennas, receivers, and/or transmitters, or may be implemented by separate physical radio interfaces, e.g., by using dedicated antennas, receivers, and/or transmitters. In the 3GPP LTE scenario, the backhaul interface may correspond to the Un interface. In the concepts as described herein, the backhaul interface 152 may in particular be used to receive unicast transmissions and multicast transmissions to be forwarded by the RN 150. In addition, it may also be used to send UL data and information to the donor base station, e.g., information that the AF type relaying operation of multicast transmissions is supported. In addition, the backhaul interface 152 may also be used to receive control data from the donor base station. The access interface 153 may in particular be used to send multicast transmissions and unicast transmissions to UEs. Further, the access interface 153 may also be used to receive unicast transmissions from UEs, to send control data to UEs and/or receive control data from UEs, and to send reference signals to UEs.

Further, the RN 150 includes a processor 154 coupled to the backhaul interface 152 and the access interface 153, and a memory 160 coupled to the processor 154. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 154 so as to implement the above-described functionalities of relaying unicast transmissions by applying the DF type relaying operation and relaying multicast transmissions by applying the AF type relaying operation. For this purpose, the processor 154 implements a first relay path 156 and a second relay path 158, which may correspond to the first and second relay paths 630 and 640 as explained in connection with FIG. 6. For example, the backhaul interface 152 may implement the receive antenna 610 and the receiver 620 of FIG. 6, and the access interface 153 may implement the power amplifier 660, the transmitter 670 and the transmit antenna 680 of FIG. 6. The processor itself may in turn implement the decoder 631, the scheduling processor 632, the encoder 633, the switch 650, the protocol processor 690, and the controller 700 of FIG. 6.

The memory 160 may include a coding module 161 so as to implement the above-described decoding and encoding of transmissions. The memory 160 may further include a scheduling module 162 so as to implement the above-described scheduling of unicast transmissions. Further, the memory 160 may include a control module 163 so as to implement various control functionalities, e.g., control switching between the DF type relaying operation and the AF type relaying operation.

It is to be understood that the structure as illustrated in FIG. 7 is merely schematic and that the RN 150 may actually include further components which, for the sake of clarity, have not been illustrated, e.g., further interfaces such as a maintenance interface. Also, it is to be understood that the memory 160 may include further types of program code modules, which have not been illustrated. According to some embodiments, also a computer program product may be provided for implementing concepts according to embodiments of the invention, e.g., a medium storing the program code to be stored in the memory 160.

Figure 8:
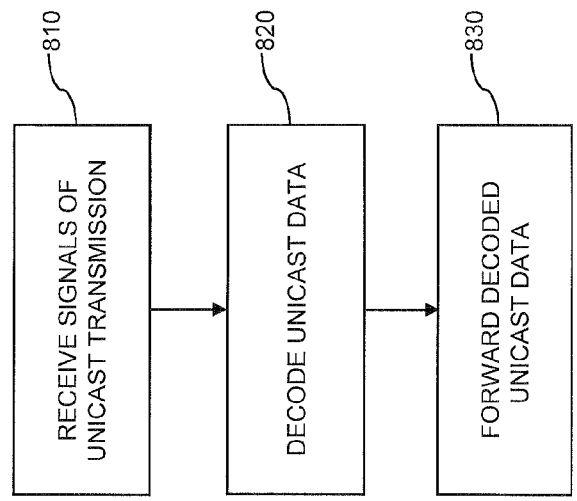
FIG. 8 shows a flowchart for illustrating relaying of unicast data in a method according to an embodiment of the invention.
Figure 9:
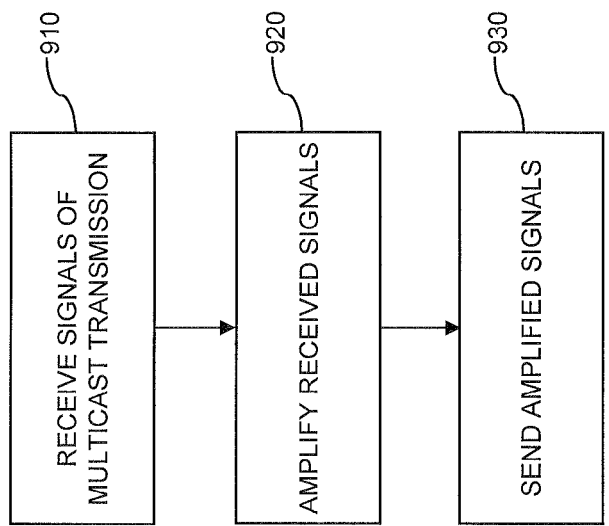
FIG. 9 shows a flowchart for illustrating relaying of multicast data in a method according to an embodiment of the invention.

FIGS. 8 and 9 show flowcharts for illustrating a method of relaying unicast data and multicast data in a wireless network. More specifically, FIG. 8 illustrates a process for relaying unicast transmissions in this method, and FIG. 9 shows a flowchart for illustrating a process for relaying multicast transmissions in this method. The process of FIG. 8 may in particular implement the above-described DF type relaying operation applied to unicast transmissions. The process of FIG. 9 may in particular implement the above-described AF type relaying operation applied to multicast transmissions. It is to be understood that a RN, e.g., the RN 150 as described above, may combine the processes of FIGS. 8 and 9 as appropriate to implement a hybrid relaying operation of both unicast data and multicast data. In particular, the processes may be performed in any suitable order and may be repeated as necessary. Also, process steps of FIGS. 8 and 9 may be interleaved, e.g., to obtain transmission patterns as illustrated in FIGS. 2 and 3.

At step 810, the RN receives first unicast transmission signals, e.g., by means of a receiver such as the receiver 620 of FIG. 6. The RN is configured for operation on the basis of a radio frame comprising a plurality of subframes, and the first unicast transmission signals are received in one of these subframes, in the following referred to as first subframe. In some embodiments, the wireless network is configured as a 3GPP LTE network and these subframes may be MBSFN subframes, which are suitable for joint MBSFN transmissions, and non-MBSFN or regular subframes.

At step 820, the RN decodes the first unicast transmission signals to obtain unicast data. The decoding may for example be accomplished by a decoder such as the decoder 631 of FIG. 6.

At step 830, the RN forwards the decoded unicast data by sending second unicast transmission signals. This is accomplished in another one of the subframes, in the following referred to as second subframe. The RN may appropriately schedule the sending of the second unicast transmission signals, e.g., on the basis of received control data. For example, such control data may be received from a base station sending the first unicast transmission signals, also referred to as a donor base station, e.g., from the base station 110 as described above.

At step 910, the RN receives multicast transmission signals, e.g., by a receiver such as the receiver 620 of FIG. 6. The multicast transmission signals could be received from the donor base station, but also from some other source, e.g., from another RN or another base station. The reception of the multicast transmission signals is accomplished in still another one of the subframes, in the following referred to as third subframe.

At step 920, the RN amplifies the received multicast transmission signals, e.g., by means of an amplifier such as the power amplifier 660 of FIG. 6.

At step 930, the RN sends the amplified multicast transmission signals, e.g., by means of a transmitter such as the transmitter 670 of FIG. 6. This sending of the multicast transmission signals is accomplished in the same subframe as the reception of the multicast transmission signals, i.e., in the third subframe. In some embodiments, the RN may send the amplified multicast transmission signals synchronously with the multicast transmission signals as sent by the donor base station. In addition, the RN may send the amplified multicast transmission signals synchronously with further multicast transmission signals from at least one further base station and/or at least one further relay node. This synchronous sending of the multicast transmission signals may in particular correspond to a joint MBSFN transmission.

As mentioned above, the RN may also receive control data from the donor base station. For example, the subframes may each comprise a control region and a data region, and the control data may be received by decoding signals in the control region or in the data region of a subframe. In some scenarios, the control data may be received by decoding signals in the control region of the third subframe, e.g., in the control region of a MBSFN subframe. In some scenarios, the control data may also be received by decoding signals in the data region of the third subframe, e.g., in the data region of a MBSFN subframe. Here, it should be noted that the decoding of the signals in the data region of the third subframe is compatible with a AF type relaying operation because this decoding does not need to be accomplished before forwarding the amplified multicast transmission signals, but can be accomplished later so that there is no excessive delay in the relaying operation. In some scenarios, the control data may also be received by decoding signals in the control region of the first subframe, e.g., in the control region of a non-MBSFN subframe.

In some cases, the control data may also be received by decoding dedicated unicast transmissions from the donor base station. For example, the RN may receive third unicast transmission signals in still another one of the subframes, in the following referred to as fourth subframe, and obtain the control data by decoding the third unicast transmission signals. Typically, the RN will not relay such dedicated unicast transmissions.

In some scenarios, the control data may also be received in a message from the donor base station, e.g., in a message defined on a higher protocol layer such as in the RRC protocol. Such control data may be received by decoding signals in the data region of the first subframe, e.g., in the data region of a non-MBSFN subframe.

The received control data may be used for various purposes, such as scheduling unicast transmissions by the RN. In some scenarios, the RN may use the received control data as a basis for determining that the third subframe is configured to be used for a multicast transmission by the donor base station, e.g., is configured as a MBSFN subframe of the donor base station. In some scenarios, the RN may use the received control data as a basis for determining that the third subframe is actually used by the donor base station for a multicast transmission, e.g., for a MBSFN transmission. The RN may then use this information for controlling switching between an operating mode for the relaying of unicast transmissions according to the process of FIG. 8 and an operating mode for the relaying of multicast transmissions according to the process of FIG. 9.

In the concepts as explained above, both unicast data and multicast data may be relayed in an efficient manner. In particular, the AF type relaying operation as applied to the multicast transmissions uses requires no additional subframes on the backhaul link which means that more subframes are available for the unicast and multicast transmissions. Also, when applied in a wireless network according to 3GPP LTE, there is no excessive usage of MBSFN subframes for relaying MBSFN transmissions so that MBSFN subframes are also available for "masking" backhaul subframes. Further, it is possible to apply the concepts locally in the RN, without making changes to other components.

It is to be understood that the examples and embodiments as explained above are merely illustrative and susceptible to various modifications. For example, although the above description frequently mentions the example of a wireless network according to 3GPP LTE, the concepts could also be applied in other types of wireless networks. Further, it is to be understood that the above concepts may be implemented by using correspondingly designed software to be executed by a processor of a relay node or base station, or by using dedicated device hardware.

The invention claimed is:

1. A method of relaying data in a wireless network comprising a relay node configured for transmissions on a basis of a radio frame with a plurality of subframes, the method comprising:
   the relay node receiving, in a first subframe of the plurality of subframes, first unicast transmission signals, wherein the plurality of subframes comprises subframes configured as subframes for multicast transmission, of which some are used for unicast transmissions;
   the relay node decoding the first unicast transmission signals to obtain unicast data;
   the relay node forwarding the decoded unicast data by sending second unicast transmission signals in a second subframe of the plurality of subframes;
   the relay node receiving control data from a base station;
   the relay node determining, responsive to the received control data, that the base station uses a third subframe of the plurality of subframes for a multicast transmission and not for a unicast transmission; and
   in response to determining that the base station uses the third subframe for a multicast transmission and not for a unicast transmission, the relay node receiving, in the third subframe, multicast transmission signals from the base station, amplifying the multicast transmission signals, and synchronously with the multicast transmission signals from the base station, sending the amplified multicast transmission signals in the third subframe.

2. The method according to claim 1,
   wherein the relay node sends the amplified multicast transmission signals synchronously with further multicast transmission signals from at least one further base station and/or at least one further relay node.

3. The method according to claim 1,
   wherein the subframes each comprise a control region and a data region; and
   wherein the control data are received by decoding signals in the control region of the third subframe.

4. The method according to claim 1,
   wherein the subframes each comprise a control region and a data region; and
   wherein the control data are received by decoding signals in the control region of the first subframe.

5. The method according to claim 1,
wherein the subframes each comprise a control region and a data region; and
wherein the control data are received by decoding signals in the data region of the third subframe.

6. The method according to claim 1, comprising:
the relay node receiving, in a fourth subframe of the plurality of subframes, third unicast transmission signals;
the relay node decoding the third unicast transmission signals to obtain the control data.

7. The method according to claim 1, comprising:
receiving the control data in a message from the base station.

8. The method according to claim 1,
the relay node determining, responsive to the received control data, that the third subframe is configured to be used for a multicast transmission.

9. The method according to claim 1, comprising:
the relay node switching, responsive to the received control data, between an operating mode for said forwarding of the decoded unicast data and a second operating mode for said sending of the amplified multicast transmission signals.

10. The method according to claim 1,
wherein the wireless network is configured as a $3^{rd}$ Generation Partnership Project (3GPP) Long Term Evolution (LTE) network and the third subframe corresponds to a Multimedia Broadcast/Multicast Services over Single Frequency Network (MBSFN) subframe.

11. A relay node configured for transmissions on a basis of a radio frame comprising a plurality of subframes, the relay node comprising:
a first relay circuit;
a second relay circuit;
a transmitter;
a switch configured to selectively couple either the first relay circuit or the second relay circuit to the transmitter; and
a controller;
wherein the plurality of subframes comprises subframes configured as subframes for multicast transmission, of which some are used for unicast transmissions;
wherein the first relay circuit is configured to receive, in a first subframe of the plurality of subframes, first unicast transmission signals, to decode the first unicast transmission signals to obtain unicast data, and to forward the decoded unicast data by sending second unicast transmission signals in a second subframe of the plurality of subframes;
wherein the second relay circuit is configured to receive, in a third subframe of the plurality of subframes, multicast transmission signals, to amplify the received multicast transmission signals, and to send the amplified multicast transmission signals in the third subframe;
wherein the controller is configured to obtain control data from a base station sending said multicast transmission signals and to control the switch responsive to the received control data by determining, responsive to the received control data, that the base station uses the third subframe for a multicast transmission, and in response to determining that the base station uses the third subframe for a multicast transmission and not for a unicast transmission, control the switch to use the second relay circuit to amplify the multicast transmission signals and, synchronously with the multicast transmission signals from the base station, send the amplified multicast transmission signals in the third subframe.

12. The relay node according to claim 11, comprising:
an amplifier shared by the first relay circuit and the second relay circuit.

13. The relay node according to claim 11,
wherein the relay node sends the amplified multicast transmission signals synchronously with further multicast transmission signals from at least one further base station and/or at least one further relay node.

14. The method according to claim 1, wherein the first subframe of the plurality of subframes is configured as a subframe for multicast transmission that is used for unicast transmission, and
wherein the second subframe of the plurality of subframes is a subframe configured for unicast transmission.

15. The method according to claim 1, wherein the first subframe of the plurality of subframes is configured as a subframe for multicast transmission that is used for unicast transmission, and
wherein the control data indicates that the first subframe is one of the multicast subframes that is used for unicast transmission and that the third subframe is one of the multicast subframes that is used for multicast transmission.

16. The method according to claim 15, wherein the multicast subframes configured as subframes for multicast transmission are Multimedia Broadcast/Multicast Services over Single Frequency Network (MBSFN) subframes.

17. The relay node according to claim 11, wherein the first subframe of the plurality of subframes is configured as a subframe for multicast transmission that is used for unicast transmission, and
wherein the second subframe of the plurality of subframes is a subframe configured for unicast transmission.

18. The relay node according to claim 11, wherein the first subframe of the plurality of subframes is configured as a subframe for multicast transmission that is used for unicast transmission, and
wherein the control data indicates that the first subframe is one of the multicast subframes that is used for unicast transmission and that the third subframe is one of the multicast subframes that is used for multicast transmission.

19. The relay node according to claim 18, wherein the multicast subframes configured as subframes for multicast transmission are Multimedia Broadcast/Multicast Services over Single Frequency Network (MBSFN) subframes.

* * * * *